United States Patent
Rozsypal

(10) Patent No.: US 6,781,353 B2
(45) Date of Patent: Aug. 24, 2004

(54) SYNCHRONOUS REGULATOR WITH SWITCHABLE CURRENT REFERENCE SOURCE

(75) Inventor: Antonin Rozsypal, Hutisko-Solanec (CZ)

(73) Assignee: Semiconductor Components Industries, L.L.C., Phoenix, AZ (US)

( * ) Notice: Subject to any disclaimer, the term of this patent is extended or adjusted under 35 U.S.C. 154(b) by 0 days.

(21) Appl. No.: 10/102,506

(22) Filed: Mar. 20, 2002

(65) Prior Publication Data

US 2003/0178974 A1 Sep. 25, 2003

(51) Int. Cl.[7] .............................................. G05F 1/613
(52) U.S. Cl. ........................ 323/224; 323/283; 323/284
(58) Field of Search .............................. 323/224, 283, 323/285, 222, 282, 284, 286

(56) References Cited

U.S. PATENT DOCUMENTS

| | | | | |
|---|---|---|---|---|
| 5,418,707 A | | 5/1995 | Shimer et al. | |
| 5,552,694 A | * | 9/1996 | Appeltans | 323/222 |
| 5,726,845 A | * | 3/1998 | Ho | 361/86 |
| 5,745,350 A | | 4/1998 | Archer et al. | |
| 5,801,519 A | | 9/1998 | Midya et al. | |
| 5,905,370 A | | 5/1999 | Bryson | |
| 5,912,552 A | | 6/1999 | Tateishi | |
| 5,994,885 A | * | 11/1999 | Wilcox et al. | 323/285 |
| 6,288,524 B1 | * | 9/2001 | Tsujimoto | 323/285 |

* cited by examiner

Primary Examiner—Shawn Riley

(57) ABSTRACT

An integrated voltage converter (104) includes a first switch ($S_1$) that turns on with a value of a control signal (UP/DOWN) to generate a coil current ($I_{COIL}$) at a node (208) when an output voltage ($V_{OUT}$) of the voltage converter is greater than a reference voltage ($V_{BATT}-\Delta V$). A second switch ($S_2$) coupled to the node turns on with another value of the control signal to generate the coil current when the output voltage is less than the reference voltage. The coil current discharges through the second switch to an output (202) of the voltage converter to develop the output voltage.

6 Claims, 4 Drawing Sheets

SYNCHRONOUS REGULATOR WITH SWITCHABLE CURRENT REFERENCE SOURCE

BACKGROUND OF THE INVENTION

The present invention relates in general to integrated circuits and, more particularly, to up-down voltage converters integrated on a semiconductor substrate.

Many applications use voltage converters to convert an input voltage at one value to either a higher or lower valued output voltage as needed by a load circuit. For example, portable smart card readers typically use a battery to supply a typical input voltage of about 3.6 volts. A voltage converter in the card reader uses the battery voltage to generate a transformer or coil current that is used to develop an output voltage at either three volts or five volts, depending on the type of smart card which is inserted into the reader. Most smart card readers maintain a low fabrication cost by using a single up-down voltage converter to step the battery voltage to five volts or down to three volts as needed.

Previous up-down voltage converters use a four transistor bridge arrangement to switch the coil current to develop the output voltage. However, this arrangement routes the coil current serially through two of the transistors, which results in power being dissipated by the resistance of two conducting transistors. To avoid an excessive power loss, larger transistors with lower resistances are used, but the large transistors occupy a large die area, which therefore increases the cost of manufacturing the voltage converters.

Hence, there is a need for an up-down voltage converter and method of converting a voltage that uses fewer transistors in order to reduce the cost and increase the power efficiency of the voltage converter.

DETAILED DESCRIPTION OF THE DRAWINGS

In the figures, elements having the same reference number have similar functionality.

Figure 1:
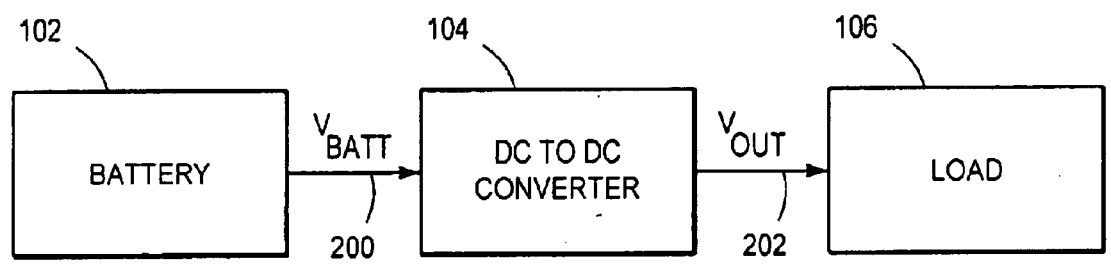
FIG. 1 is a block diagram of a portable smart card reader using a voltage converter to generate an output voltage.

FIG. 1 is a schematic diagram of a portable smart card reader 10 operating with a load 106 that includes an inserted smart card, including a battery 102 and a direct current (DC) to DC voltage converter 104. In one embodiment, battery 102 provides a battery supply voltage $V_{BATT}$ operating at a voltage of about 3.6 volts.

DC to DC converter 104 converts battery supply voltage $V_{BATT}$ received at an input node 200 to an output supply voltage $V_{OUT}$ at an output node 202. The circuitry designated as load 106 includes a smart card that may be either of two types, i.e., a three volt smart card or a five volt smart card, referring to the supply voltage specified for operating each type of smart card. The type of smart card is detected by system 10 and the corresponding value of VOUT is provided by converter 104. Hence, if a three volt smart card is inserted, converter 104 operates in a step down mode to convert $V_{BATT}$=3.6 volts to a lower output supply voltage $V_{OUT}$=3.0 volts. If a five volt smart card is inserted, converter 104 operates in a step up mode to convert $V_{BATT}$=3.6 volts to a higher output supply voltage $V_{OUT}$=5.0 volts.

Figure 2:
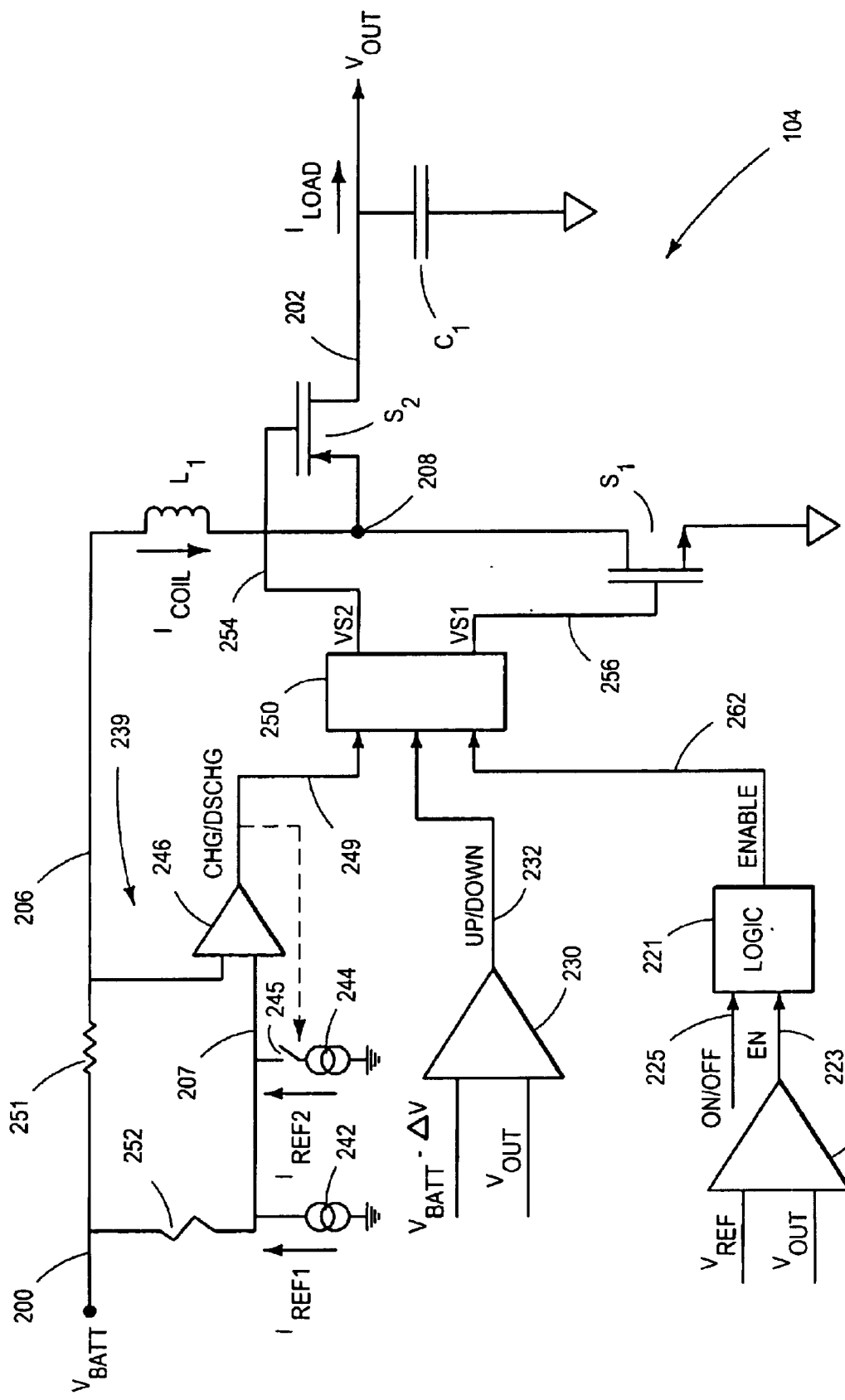
FIG. 2 is a schematic diagram showing further detail of the voltage converter.

FIG. 2 is a schematic diagram showing DC to DC converter 104 in further detail, including an inductor or coil $L_1$, a capacitor $C_1$, transistor switches $S_1$ and $S_2$, comparators 220, 230 and 246, current sources 242 and 244, logic blocks 221 and 250 and resistors 251 and 252. Battery supply voltage $V_{BATT}$ is received at node 200 and output supply voltage $V_{OUT}$ is produced at node 202 to have a value of either 3.0 volts or 5.0 volts, depending on the type of smart card. $V_{OUT}$ supplies a load current $I_{LOAD}$ of about fifty milliamperes to operate a smart card included in load 106. Except for coil $L_1$ and capacitor $C_1$, the components shown in FIG. 2 are formed on a single semiconductor die as an integrated circuit. In one embodiment, coil $L_1$ has a value of about twenty-two microhenries and capacitor $C_1$ has a value of about ten microfarads.

Switch $S_1$ is a standard high current n-channel metal oxide semiconductor field effect transistor (MOSFET) configured to switch a coil current $I_{COIL}$ through coil $L_1$ at a level of at least one hundred fifty milliamperes. Switch $S_2$ is a standard high current p-channel MOSFET also capable of supplying coil current $I_{COIL}$ at a level of at least one hundred fifty milliamperes.

Comparator 220 monitors output supply voltage $V_{OUT}$ for comparing with a reference voltage $V_{REF}$ to provide voltage regulation. A digital enabling signal EN is produced on a node 223 with a logic high value to activate switch $S_1$ and/or switch $S_2$ through logic blocks 221 and 250 when $V_{OUT}$ is below its predetermined regulation value of either three or five volts. Comparator 220 is referred to as a hysteretic comparator since its inputs typically are configured to have about one hundred millivolts of hysteresis to avoid excessive switching when $V_{OUT}$ is near its target regulation value.

Logic block 221 has an input at a node 225 for receiving an ON/OFF enabling signal that activates DC to DC converter 104 when a smart card is inserted in the reader. When no smart card is present, ON/OFF initiates a standby mode which deactivates portions of converter 104 to reduce standby power consumption. Hence, ON/OFF has the effect of disabling switches $S_1$ and $S_2$ during the standby mode. An output provides an enabling signal ENABLE on a node 262.

Comparator 230 compares output supply voltage $V_{OUT}$ with a reference voltage ($V_{BATT}-\Delta V$) to determine whether converter 104 is operating in an up- or down-conversion mode. The advantages of setting the reference at a few hundred millivolts below $V_{BATT}$ is described in detail below. In one embodiment, $\Delta V$ has a value of about two hundred millivolts. The comparison produces a digital mode signal UP/DOWN on a node 232.

Current sources 242 and 244 supply reference currents $I_{REF1}$ and $I_{REF2}$, respectively, that flow through resistor 252 to battery supply voltage $V_{BATT}$ and establish a reference potential $V_{207}$ on a node 207.

Resistors 251–252 are matched or scaled to provide resistances $R_{251}$ and $R_{252}$, respectively, in a ratio that is constant over a specified range of operating, processing and environmental conditions. In one embodiment, $R_{251}$ is about two ohms and $R_{252}$ is about two kilohms to provide a resistance ratio $R_{252}/R_{251}$ of about 1000:1.

Comparator 246, in combination with resistors 251–252, current sources 242 and 244 and a switch 245, essentially functions as a current sensor 239. An input coupled to a node 206 receives a voltage $V_{206}$ resulting from the flow of coil current $I_{COIL}$ through resistor 251. Another input receives reference potential $V_{207}$ for comparing with voltage $V_{206}$ to produce a digital phase signal CHG/DSCHG at an output on a node 249 to control whether coil current $I_{COIL}$ is charging or discharging, i.e., increasing or decreasing. When $I_{COIL}$ is charging, CHG/DSCHG is logic high to close switch 245 so that $V_{207}=V_{CHG}=V_{BATT}-R_{252}*(I_{REF1}+I_{REF2})$. When $I_{COIL}$ is discharging, CHG/DSCHG is logic low to open switch 245 so that $V_{207}=V_{DSCHG}=V_{BATT}-R_{252}*I_{REF1}$. In effect, $V_{CHG}$ functions to set a maximum or upper current $I_{PEAK}=(R_{252}/R_{251})*(I_{REF1}+I_{REF2})$ for $I_{COIL}$, while $V_{DSCHG}$ functions to set a minimum or lower current limit $I_{VALLEY}=(R_{252}/R_{251})*I_{REF1}$ for $I_{COIL}$.

Logic block 250 includes a combinational logic circuit whose inputs receive ENABLE, UP/DOWN and CHG/DSCHG as control signals and whose outputs at nodes 256 and 254 produce drive signals VS1 and VS2 for driving the gates of switches $S_1$ and $S_2$, respectively. A truth table for logic block 250 is shown in Table I below, where H indicates a logic high level, L indicated a logic low, and X indicates a "don't care" state, i.e., either H or L. Note that logic block 250 includes level shifting circuitry to provide logic high values for VS1 and VS2 at the potential of either $V_{BATT}$ or $V_{OUT}$, as described in detail below. Logic low operates at ground potential.

TABLE I

| STATE | UP/DOWN | CHG/DSCHG | ENABLE | VS2 | VS1 |
|---|---|---|---|---|---|
| I | L | H | H | L | L |
| II | L | L | H | H ($V_{BATT}$) | L |
| III | L | X | L | H ($V_{BATT}$) | L |
| IV | H | H | H | H ($V_{OUT}$) | H ($V_{OUT}$) |
| V | H | L | H | L | L |
| VI | H | X | L | H ($V_{OUT}$) | L |

Figure 3:
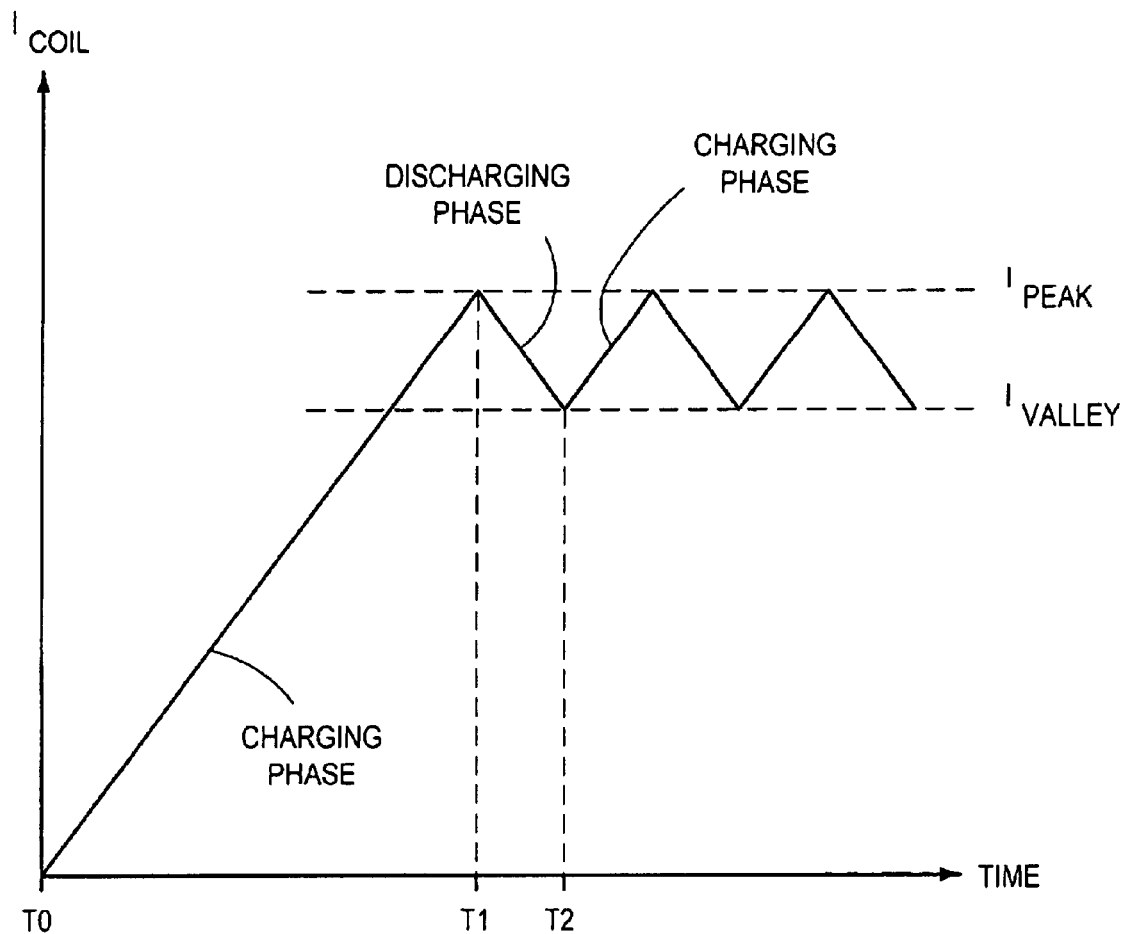
FIG. 3 is a timing diagram showing a waveform of the coil current generated by the voltage converter.

The detailed operation of converter 104 can be understood by referring to FIG. 3, which shows a waveform of coil current $I_{COIL}$ versus time over several cycles of operation. First, the down conversion mode is described as follows, assuming that $V_{BATT}=3.6$ volts and $V_{OUT}=3.0$ volts.

Assume further that initially, at time T0, output supply voltage $V_{OUT}$ is zero and coil current $I_{COIL}$ is zero. The logic values for ENABLE, UP/DOWN and CHG/DSCHG are represented in Table 1 as state I. CGH/DSCHG is logic high to close switch 245 to sum reference currents $I_{REF1}$ and $I_{REF2}$ at node 207. VS1 is logic low so switch $S_1$ is off. VS2 is low, so switch $S_2$ is turned on to form a conduction path between a node 208 and output node 202. The initial voltage across coil $L_1$ is $(V_{BATT}-V_{OUT})$, which is nearly equal to $V_{BATT}$. Coil current $I_{COIL}$ increases with time to charge or store magnetic energy in coil $L_1$, and is routed through $S_2$ to output node 202. This period when $I_{COIL}$ is charging or increasing is designated as the charging phase of operation. Hence, during the charging phase, $I_{COIL}$ flows to capacitor $C_1$ to begin to develop output supply voltage $V_{OUT}$. For typical values of $C_1$, $V_{OUT}$ increases a few hundred millivolts during the first cycle.

At time T1, $I_{COIL}$ increases to its maximum limit value $I_{PEAK}$, which causes comparator 246 to switch CHG/DSCHG to a logic low value as shown in state II of Table I. In one embodiment, $I_{PEAK}$ has a value of about one hundred fifty milliamperes. Switch 245 is opened so only reference current $I_{REF1}$ flows through resistor 252, setting potential $V_{207}$ to a value representative of minimum current level $I_{VALLEY}$. VS2 is set to a logic high value of $V_{BATT}$, which allows the potential of node 208 to rise until switch $S_2$ turns on to discharge $I_{COIL}$ into capacitor $C_1$ to further develop the potential of $V_{OUT}$. This period during which $I_{COIL}$ is decaying or decreasing is designated as the discharging phase of $I_{COIL}$.

At time T2, $I_{COIL}$ decays to a value equal to $I_{VALLEY}$, causing comparator 246 to produce CHG/DSCHG with a logic high value and VS2 with a logic low value to begin another cycle indicated in Table I as state I. Note that switch $S_1$ remains off during both the charging and discharging phases of the above described cycle. Note further that switch $S_2$ routes $I_{COIL}$ to charge capacitor $C_1$ during both the charging and discharging phases of $I_{COIL}$, i.e., when $I_{COIL}$ is both increasing and decaying. This scheme allows $V_{OUT}$ to be developed in fewer cycles and, by switching $I_{COIL}$ only through a single device $S_2$, converter 104 functions with a low parts count and fabrication cost as well as a high power efficiency. The period from T0 to T2 to complete one cycle typically ranges from about two to ten microseconds, or a frequency between one hundred kilohertz and five hundred kilohertz. It is considered desirable to maintain the period within this time range in order to control electromagnetic interference and to maintain tighter regulation of $V_{OUT}$.

When converter 104 is operating as described above as a step down voltage converter in which the target value of $V_{OUT}$ is less than $V_{BATT}$, the cycles continue to alternate between state I and state II as described until capacitor $C_1$ has accumulated sufficient charge from $I_{COIL}$ to reach the $V_{OUT}$ target value of 3.0 volts. At that point, logic block 221 generates a logic low level for ENABLE, which switches VS2 to a logic high $V_{BATT}$ potential, allowing $I_{COIL}$ to decay to zero and deactivating switches $S_1$ and $S_2$. This idle condition is shown in Table I as state III. Converter 104 remains in this idle state until $V_{OUT}$ decays by the amount of hysteresis in comparator 220, when ENABLE is again set logic high to begin a new cycle.

Now assume converter 104 is operating in a step up converter mode in which 5.0 volts is the target value of $V_{OUT}$ which is higher than $V_{BATT}=3.6$ volts. ENABLE is high and operation proceeds as described above until $V_{OUT}$ is within $\Delta V$ volts of $V_{BATT}$. At this point, the switching frequency of converter 104 decreases to about one hundred kilohertz because of the low potential $(V_{BATT}-V_{OUT})$ across coil $L_1$. As $V_{OUT}$ reaches the value of reference voltage $(V_{BATT}-\Delta V)$, comparator 230 produces UP/DOWN with a logic high value to switch the operation to the step up or up conversion mode shown as state IV in Table I. In one embodiment, $\Delta V$ has a value of about two hundred millivolts, so when $V_{BATT}=3.6$ volts, reference voltage $(V_{BATT}-\Delta V)=3.4$ volts approximately. The operation proceeds as follows.

The charging phase, when $I_{COIL}$ is increasing, occurs by setting VS1 to a logic high to turn on switch S1. This mode of operation allows $I_{COIL}$ to increase more rapidly because the voltage across coil $L_1$ is essentially $V_{OUT}$, rather than $V_{OUT}-V_{BATT}$. This technique maintains the operating frequency of converter 104 above at least one hundred kilohertz. $I_{COIL}$ increases until reaching the value of $I_{PEAK}$, at which time comparator 246 generates CHG/DSCH with a logic low, VS1 undergoes a high to low transition to turn off $S_1$, and VS2 is made logic low, turning on switch $S_2$ to discharge $I_{COIL}$ into capacitor $C_1$, as shown as state V in Table I. When $I_{COIL}$ decays to the value of $I_{VALLEY}$, converter 104 returns to state IV of Table I. Converter 104 alternates between states IV and V until $V_{OUT}$ increases to its target value, at which point logic block 221 generates ENABLE with a logic low to put converter 104 in an idle state designated as state VI in Table I.

Figure 4:
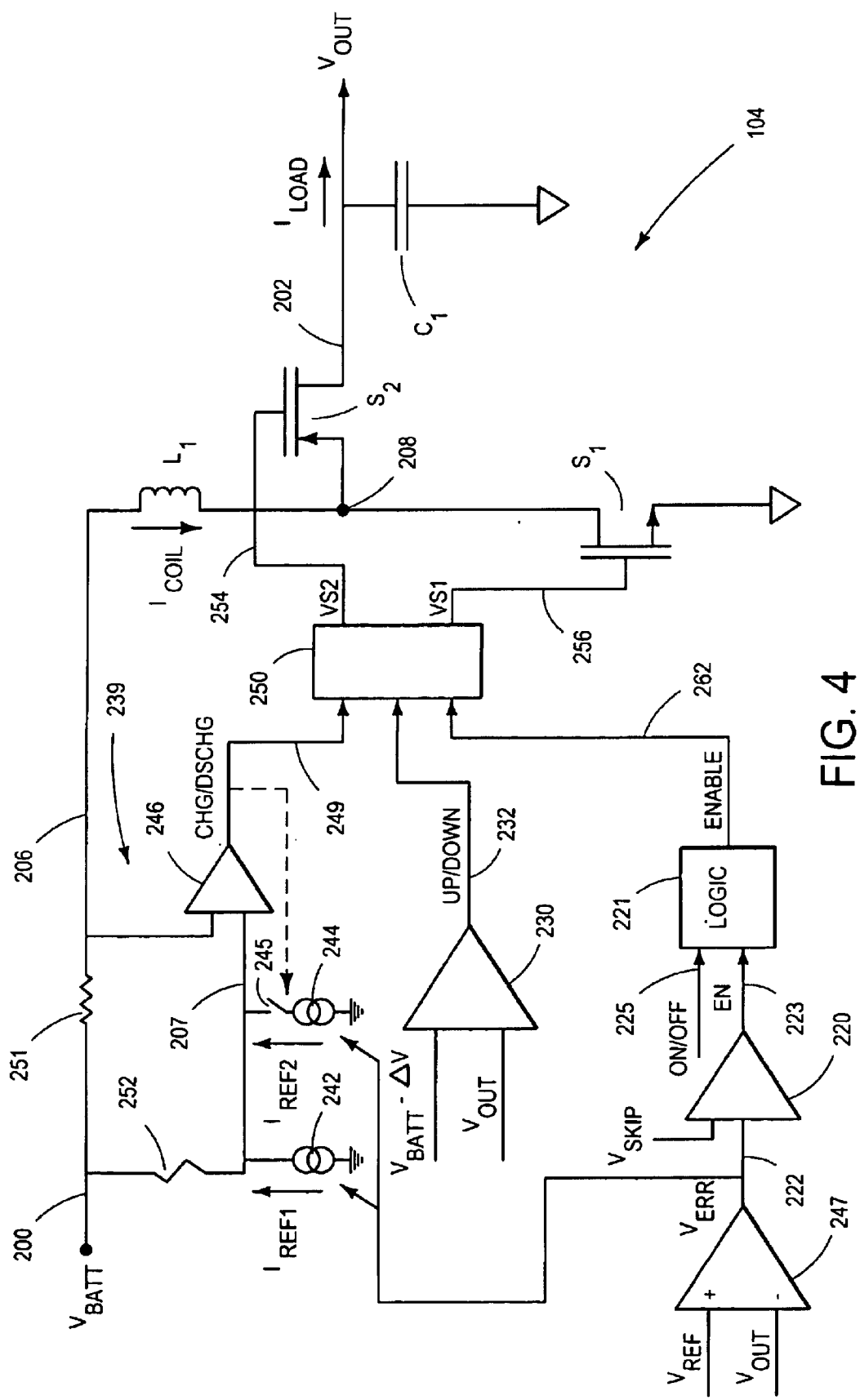
FIG. 4 is a schematic diagram showing the voltage converter in an alternate embodiment.

FIG. 4 is a schematic diagram showing DC to DC converter 104 in an alternate embodiment incorporating an analog type regulation of $V_{OUT}$, rather than the hysteretic regulation of the embodiment shown in FIG. 2. The structure and operation of most of the devices are similar to what has been described, except for the addition of an error amplifier 247 and the function of current sources 242 and 244.

Error amplifier 247 is a standard analog amplifier formed in the regulation feedback path to produce an analog error signal $V_{ERR}$ on a node 222 as a difference between output supply voltage $V_{OUT}$ and reference voltage $V_{REF}$. $V_{ERR}$ is coupled to an input of comparator 220 for comparing with a skip threshold voltage $V_{SKIP}$ to produce digital enabling signal EN, which functions as described above. When $V_{ERR}$ is larger than $V_{SKIP}$, i.e., when converter 104 is essentially out of regulation, EN is logic high. However, in order to avoid excessive switching when $V_{OUT}$ is at or near its target value, when $V_{ERR}$ is less than $V_{SKIP}$, EN is made logic low to put converter 104 in an idle state, either state III or state VI. In effect, $V_{SKIP}$ sets a regulation limit within which converter 104 is idled. In one embodiment, $V_{SKIP}$ has a value of about fifty millivolts, which means converter 104 regulates to within fifty millivolts of its target value.

As a feature of this embodiment, as $V_{OUT}$ approaches its target value, the limit currents $I_{PEAK}$ and $I_{VALLEY}$ have values which are adjusted in an analog fashion by $V_{ERR}$. Hence, as $V_{OUT}$ approaches its target value, $I_{PEAK}$ and $I_{VALLEY}$ are reduced accordingly to allow smaller corrections to be made to $V_{OUT}$ while maintaining operation over a narrower frequency range. In one embodiment, $I_{REF1}$ has an adjustment range between about ten and about one hundred microamperes, and $I_{REF2}$ is adjustable from about twenty to about two hundred microamperes.

In summary, the present invention provides a voltage converter circuit and method of converting a voltage that has a high performance and a low manufacturing cost. A first transistor is switched on by a first value of a control signal to generate a coil current at a node when the converter's output voltage is greater than a reference voltage. A second switch is turned on by a second value of the control signal to generate the coil current when the output voltage is less than the reference voltage. The second switch is coupled between the node and the output of the converter circuit to discharge the coil current to develop the output voltage with either value of the control signal. The converter adjusts to either a step up or step down conversion mode automatically while using only two high current switching transistors that can be integrated on the same semiconductor die with control circuitry using a standard CMOS process. Since the coil current is routed through only one switching transistor at a time, the voltage converter has a low switching resistance and a high power efficiency. Moreover, by using only two switching transistors to charge and discharge the coil current for up or down conversion, the voltage converter occupies a small die area and consequently has a low fabrication cost. While regulating, the coil current fluctuates between upper and lower current limits, and therefore decays to zero only under a no load or idling condition. By operating with a nonzero coil current, a high switching efficiency is achieved while reducing coil ringing during switching to maintain a low level of electromagnetic interference. In addition, the benefits of the invention are obtained by using an inductor or coil, rather than a more expensive transformer, which further reduces the fabrication cost of a system.

What is claimed is:

1. An integrated converter circuit comprising:
   a first switch that turns on with a first value of a control signal to generate a coil current at a node when an output voltage of the integrated converter circuit is greater than a first reference voltage;
   a second switch coupled to the node and turning on with a second value of the control signal to generate the coil current when the output voltage is less than the first reference voltage, wherein the coil current is discharged through the second switch to an output of the integrated converter circuit to develop the output voltage;
   a first comparator having a first input for sensing the output voltage, a second input receiving the first reference voltage and an output for providing the control signal; and
   a second comparator having a first input for sensing the output voltage, a second input receiving a second reference voltage and an output coupled for enabling the first and second switches.

2. An integrated converter circuit, comprising:
   a first switch that turns on with a first value of a control signal to generate a coil current at a node when an output voltage of the integrated converter circuit is greater than a first reference voltage;
   a second switch coupled to the node and turning on with a second value of the control signal to generate the coil current when the output voltage is less than the first reference voltage, wherein the coil current is discharged through the second switch to an output of the integrated converter circuit to develop the output voltage;
   a first current source providing a first current to set a minimum value to which the coil current decays; and
   a second current source operating in response to a switching signal for providing a second current that is summed with the first current to establish a maximum value to which the coil current increases.

3. The integrated converter circuit of claim 2, further comprising a comparator having a first input for sensing the coil current, a second input coupled for sensing the first and second currents and an output for providing the switching signal for enabling the second current source.

4. A voltage converter, comprising:
   a first comparator for comparing an output signal of the voltage converter with a first reference signal to produce a first control signal;
   a first transistor coupled for charging a coil current with the first control signal when the output signal is greater than the first reference signal;
   a second transistor coupled for discharging the coil current to an output of the voltage converter to develop the output signal, wherein the second transistor responds to the first control signal by charging the coil current when the output signal is less than the first reference signal;
   a first current source for supplying a first current to a node, wherein the coil current is discharged to a minimum value indicative of the first current;
   a second current source for supplying a second current to the node, wherein the coil current is charged to a maximum value indicative of the second current; and
   a second comparator having a first input coupled for sensing the coil current, a second input coupled to the node and an output for providing a switching signal that routes the second current to the node when the coil current is charging.

5. A voltage converter, comprising:

a first comparator for comparing an output signal of the voltage converter with a first reference signal to produce a first control signal;

a first transistor coupled for charging a coil current with the first control signal when the output signal is greater than the first reference signal;

a second transistor coupled for discharging the coil current to an output of the voltage converter to develop the output signal, wherein the second transistor responds to the first control signal by charging the coil current when the output signal is less than the first reference signal;

a first current source for supplying a first current to a node, wherein the coil current is discharged to a minimum value indicative of the first current;

a second current source for supplying a second current to the node, wherein the coil current is charged to a maximum value indicative of the second current; and a second comparator that compares the output signal to a second reference signal to produce an adjustment signal for modifying levels of the first and second currents.

6. The voltage converter of claim 5, further comprising a third comparator having a first input for receiving the adjustment signal, a second input for receiving a third reference signal and an output for providing a second control signal for deactivating the first and second transistors.

* * * * *